United States Patent
Joshi

(10) Patent No.: US 12,506,751 B2
(45) Date of Patent: Dec. 23, 2025

(54) METHOD AND SYSTEM FOR SCORING SEVERITY OF CYBER ATTACKS

(71) Applicant: Arbor Networks, Inc., Westford, MA (US)

(72) Inventor: Amogh N. Joshi, Pune (IN)

(73) Assignee: Arbor Networks, Inc., Westford, MA (US)

( * ) Notice: Subject to any disclaimer, the term of this patent is extended or adjusted under 35 U.S.C. 154(b) by 218 days.

(21) Appl. No.: 17/742,131

(22) Filed: May 11, 2022

(65) Prior Publication Data
US 2023/0156019 A1    May 18, 2023

(51) Int. Cl.
*H04L 9/40* (2022.01)

(52) U.S. Cl.
CPC ...... *H04L 63/1416* (2013.01); *H04L 63/1433* (2013.01)

(58) Field of Classification Search
CPC . H04L 63/1416; H04L 63/1408; H04L 63/14; H04L 63/1433; H04L 63/1425; H04L 63/145; G06F 21/552; G06F 21/554; G06F 21/566; G06F 21/577; G06F 21/05; G06F 21/57

See application file for complete search history.

(56) References Cited

U.S. PATENT DOCUMENTS

| | | | |
|---|---|---|---|
| 8,516,597 B1 * | 8/2013 | Sharma | G06F 21/577 709/224 |
| 9,275,065 B1 * | 3/2016 | Ganesh | G06F 21/556 |
| 11,636,213 B1 * | 4/2023 | Elgressy | H04L 63/0263 726/25 |
| 2016/0359899 A1 * | 12/2016 | Zandani | H04L 63/1425 |
| 2020/0014711 A1 * | 1/2020 | Rego | H04L 63/1433 |
| 2020/0358803 A1 * | 11/2020 | Roelofs | H04L 63/1416 |

* cited by examiner

*Primary Examiner* — Kevin Bechtel
*Assistant Examiner* — Sayeda Salma Nahar
(74) *Attorney, Agent, or Firm* — Foley & Lardner LLP

(57) ABSTRACT

A computer method and system for determining a threat level score for a detected network attack. Network data is received having a detected network attack, which is then analyzed to determine metadata associated with the network attack. The determined metadata associated with the network attack is analyzed to determine: 1) an attack objective component; 2) an attack method component; and 3) an attack execution component, each being associated with the network attack. A severity score value for the network attack is then determined based upon calculating a weighted value for each of the: 1) an attack objective component; 2) a attack method component; and 3) an attack execution component. And an alert signal/message is then generated for a network attack based upon the determined severity score value.

20 Claims, 4 Drawing Sheets

METHOD AND SYSTEM FOR SCORING SEVERITY OF CYBER ATTACKS

FIELD OF THE INVENTION

The disclosed embodiments generally relates to security of computer networks from network attacks, and more particularly, to evaluating the threat level presented to a computer network from certain network attacks through utilization of a scoring method.

BACKGROUND OF THE INVENTION

Recently, an increasing number of cyber-attacks have been launched against network infrastructures, and an increasing number of network breakdowns have occurred worldwide due to malicious network attacks. There are various products currently available that provide network event and security reporting. For example, many firewall, intrusion detection system (IDS), server, switch and router products have the capability to log and present network events to a network security administrator.

Often, the threat dashboards not only present a large number of alerts, but those alerts often have a large amount of variations. There can be various types of attacks like phishing, service scanning, unauthorized access to or use of a network resource, damage or destruction of a network resource, data exfiltration/encryption, or a denial-of-service attack (DoS). Different types of attack pose different risk levels. It is to be further appreciated that different instances of a same type of network attack even have different risk levels associated with them. Under this scenario, it's often desirable for the incident response team to readily understand which alerts need to be acted upon immediately and which ones may be acted upon subsequently.

Regardless of the form of an attack, existing security products cannot generally rate the severity of an attack considering the various executional/dynamic aspects of an attack. There are some known methods which try to estimate the executional/dynamic aspects of an attack but they consider only traffic volume as the measure of the severity, which is not enough. It is to be further appreciated that incorrect or inaccurate threat level scoring may result in dangerous attacks persisting in an organization without getting noticed for prolonged time periods often causing significant monitory and reputation impact. It would be desirable to provide a system, apparatuses and methods that can rate an attack according to its severity based on both the static and the dynamic aspects of an attack and which gives freedom to the security experts to define the parameters which determine this rating.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer method and system for determining a threat level score for a detected network attack is described in which network data is received having a detected network attack. The network data is then analyzed to determine metadata associated with the network attack. The determined metadata associated with the network attack is analyzed to determine: 1) an attack objective component; 2) an attack method component; and 3) an attack execution component, each being associated with the network attack. A severity score value for the network attack is then determined based upon calculating a weighted value for each of the: 1) attack objective component; 2) attack method component; and 3) attack execution component. And an alert signal/message generated for a network attack is then augmented with the determined severity score value.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
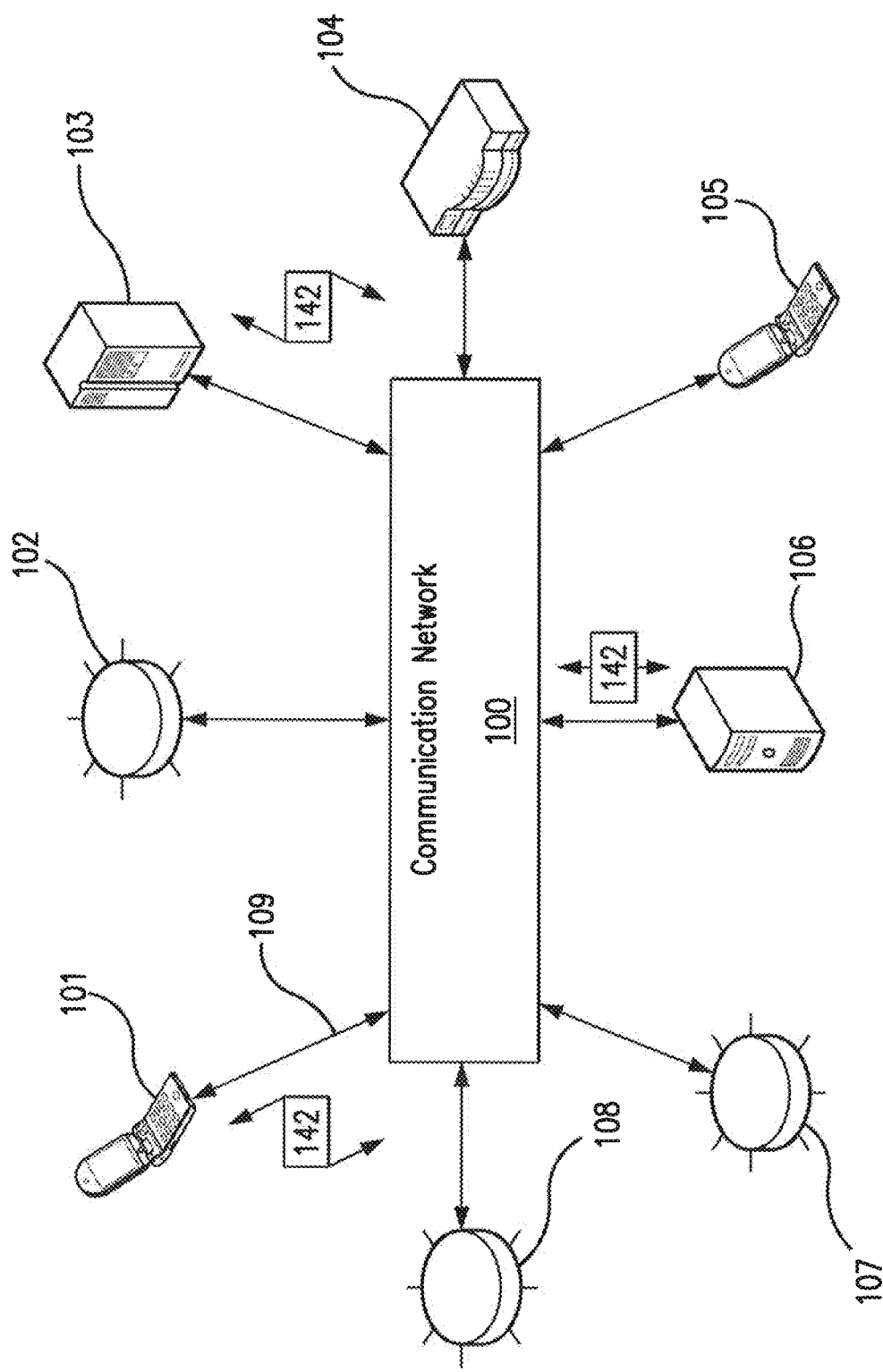
FIG. 1 illustrates a system overview and data-flow depicting an embodiment of system operation.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, threat detection system 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention for evaluating the threat level presented to a computer network from certain network attacks through utilization of a scoring method. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
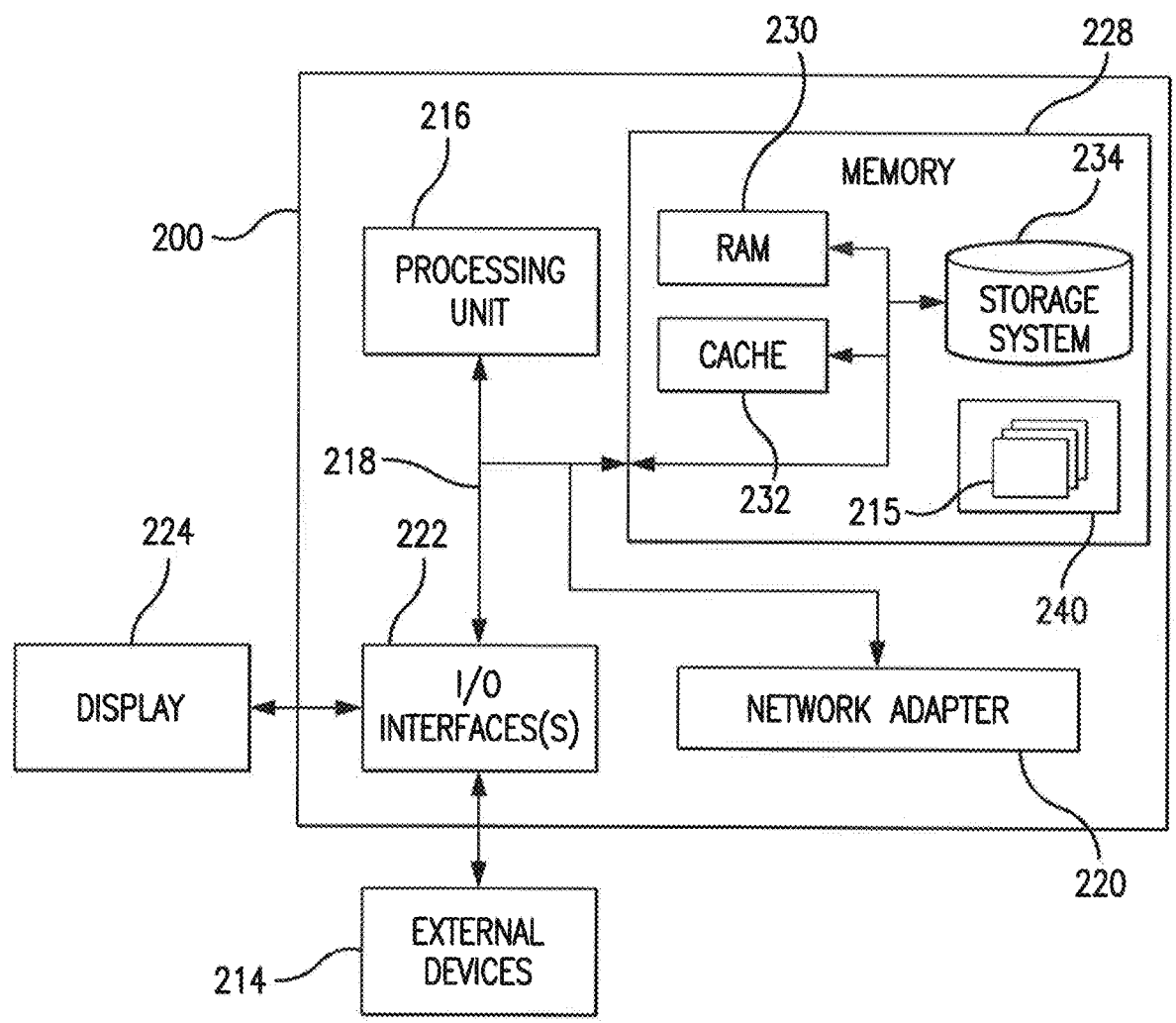
FIGS. 2 and 3 illustrate an example network device/node for implementing the illustrated embodiments.

FIG. 2 is a schematic block diagram of an example network computing device 200 (e.g., threat detection system 106) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention for evaluating the threat level presented to a computer network from certain network attacks through utilization of a scoring method. Device 200 is only one example of a suitable system and is not intended to suggest any limitation as to the scope of use or functionality of embodiments of the illustrated embodiments described herein. For instance, device 200 may be integral with a network security system for detecting and mitigating network attacks (e.g, DDoS) such as disclosed in U.S. Pat. No. 9,060,002, entitled: Adjusting DDoS Protection Based on Traffic Type, commonly assigned to Arbor Network Inc., the contents of which are hereby incorporated by reference in their entirety. It is to thus be appreciated that computing device 200 is capable of being implemented and/or performing any of the functionality set forth herein.

Computing device 200 is operational with numerous other special purpose computing system environments or configurations. Examples of well-known computing systems, environments, and/or configurations that may be suitable for use with computing device 200 include, but are not limited to, personal computer systems, server computer systems, thin clients, thick clients, multiprocessor systems, microprocessor-based systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a special purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of use of certain illustrated embodiments of the present invention will now be provided. In accordance with the illustrated it is to be appreciated that a decomposition of a cyber attack on a network 100 typically consists of scoring the severity of a network attack including detecting the components of a network attack. It is to be appreciated that in accordance with the illustrated embodiments, with regard to scoring a network attack, it is to be appreciated it generally consists of the following components:

I. Attack Objective

The "Attack Objective" is to be understood to consist of the objective which an attacker is attempting to achieve after successful execution of the attack. It is to be understood that all of the possible attack objectives may be assigned a score according to the degree of harm they represent to a network 100. For instance, the attack objective 'data exfiltration' is preferably scored higher than the attack objective discovery/reconnaissance.

II. Attack Method

The "Attack Method" is to be understood to consist of the method used by an attacker to attain a specific attack objective (a same objective can be attained by various methods). It is to be understood that generally the attacker's choice of methods often indicates the maturity and the knowledge of network insight available with the attacker. In accordance with the illustrated embodiments, the attack methods associated with a same objective may be assigned a score contingent upon the method characteristics. For instance, under the attack objective 'discovery/reconnaissance', discovery of trusted domains is preferably scored higher than the discovery of 'system time'.

III. Attack Execution

The "Attack Execution" is to be understood to consist of the intensity/aggression with which an attacker has executed a specific attack method to attain a specific attack objective. It is to be appreciated that a same attack method can be used for a same attack objective but with different intensity. For instance, 'data exfiltration' having a network traffic rate of 1 Kbps is preferably scored less as compared to the same attack method having a network traffic rate of 1 Gbps. Similarly, it is to be appreciated that the importance of data subject to the exfiltration may decide the execution score in this scenario. In another example, an alert where internal build server connects to a new external domain can be scored higher if that new domain looks like a algorithmically generated one (DGA).

In accordance with the illustrated embodiments, it is to be understood the present attack scoring system decomposes network attack threats covered by a threat detection system 106, 200 into the aforesaid three components. This is preferably accomplished through utilization of an existing threat knowledge database (such as MITRE ATT&CK) or alternatively it may utilize a custom attack threat listing. In accordance with the illustrated embodiments, the individual components preferably have preconfigured threat score coefficients and a composite threat score for a detected threat is preferably the weighted sum of the individual scoring coefficients of the aforesaid three components. Thus, in accordance with this decomposition of a network attack, a score value for a given network attack is calculated as: score(objective)+score(method)+score(execution).

Figure 3:
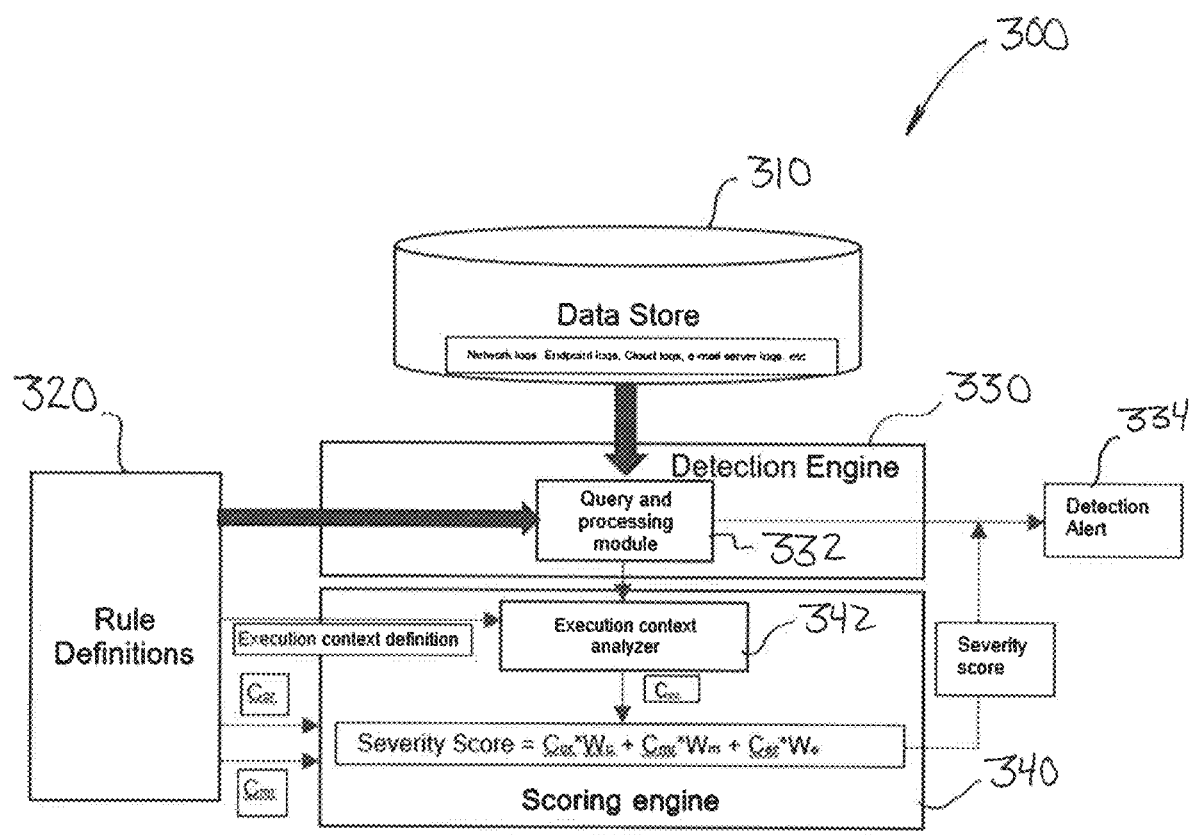

With regard to a threat detection system 106, 200 used to implement the illustrated embodiments, reference is now made to FIG. 3 depicting an exemplary threat detection system 300 using one or more components of system 200 (FIG. 2) for evaluating the threat level presented to a computer network 100 from certain network attacks through utilization of a scoring process. Starting with the data store component 310, it preferably stores the data within which the threats are to be searched. It is to be appreciated that the data may include (but is not to be understood to be limited to): network logs; endpoint logs; e-mail server logs; DNS server logs, and other or any other logs that enable threat detection. With regards to the rules definitions component 320, it preferably is configured and operable to define the signatures or the fingerprints exhibited by the malicious network activities/attacks. For instance, they may consist of packet level signatures, system operations signatures (known threats) and/or behavioral signatures (including possible behavior by unknown threats).

In accordance with the illustrated embodiments, it is to be appreciated that the definition for a given rule (r) contains the 'coefficient of the objective' ($C_{or}$) and the 'coefficient of method' ($C_{om}$) for that given rule. It is to be understood that a rule definition preferably encompasses what behavior it is looking for, thus these two aforesaid coefficients ($C_{or}$) ($C_{om}$) are known while composing the rule definition. It is to be further appreciated that the third parameter 'coefficient of execution' ($C_{er}$) is typically not known at this stage and is thus subsequently derived, as further explained herein. It is to be understood that the information required for deriving the coefficient ($C_{er}$) for a given rule (r) is preferably defined (as execution context definition) in the rule definition.

With regard to the detection engine component 330, it preferably includes a query execution and processing module 332 configured and operative to retrieve rule definitions from the rule definitions component 320 preferably searching patterns defined within the data store component 310. It is to be appreciated this may include utilization of data aggregations and other post-processing techniques. Upon finding a pattern defined in the rule definition, the detection engine component 330 is preferably configured and operative to generate an alert 334 preferably enriched with contextual metadata.

And with regard now to the scoring engine component 340, it is preferably configured and operative for generating a severity score for a threat detection alert generated by the detection engine component 330. It is to be appreciated that even though it is shown as a separate component in FIG. 3, it is to be understood this is merely a logical representation as the scoring engine component 340 may be integral with the detection engine component 330.

In accordance with the illustrated embodiments, the resultant severity score is preferably the weighted sum of the severity score for the above mentioned three components: namely, the attack objective, the attack method and the attack execution, which is preferably calculated via the equation:

$$\text{Severity Score} = C_{or}*W_o + C_{mr}*W_m + C_{er}*W_e$$

whereby:

stands for multiplication;
$C_{or}$ is the objective score coefficient for rule r;
$C_{mr}$ is the method score coefficient for rule r;
$C_{er}$ is the execution score coefficient for rule r;
$W_o$ is the weight for the objective score;
$W_m$ is the weight for the method score; and
$W_e$ is the weight for the execution score.

In accordance with the illustrated embodiments, the objective score and the method score are preferably directly calculated as the corresponding coefficients which are readily available from the rule definitions, and wherein all the weights are predefined. And with regard to the execution score, this is to be understood to be a dynamic value. It is to be appreciated that it is preferable to differentiate/score and the multiple alerts raised by a same rule (r) based upon the aggression with which the corresponding attacks were executed. With regard to the dynamic value of the execution score ($C_{er}$), an execution context analyzer 342 preferably utilizes the execution context definition from the rule definition to derive required attributes from the contextual metadata provided by the detection engine 330 to calculate the coefficient of execution ($C_{er}$) for the alert of a given rule.

In accordance with the illustrated embodiments, it is to be understood different rules capture different malicious behaviors and the corresponding execution context definitions preferably define a scale of one or more attributes which are relevant to measure the execution aggression for that rule. Hence, the execution context definition for a given rule is a formula which calculates the execution score coefficient using the contextual metadata relevant for that rule, after the rule is hit. The execution context analyzer 342 may be further configured and operable to scale-up the score contribution based on the asset criticalness.

Figure 4:
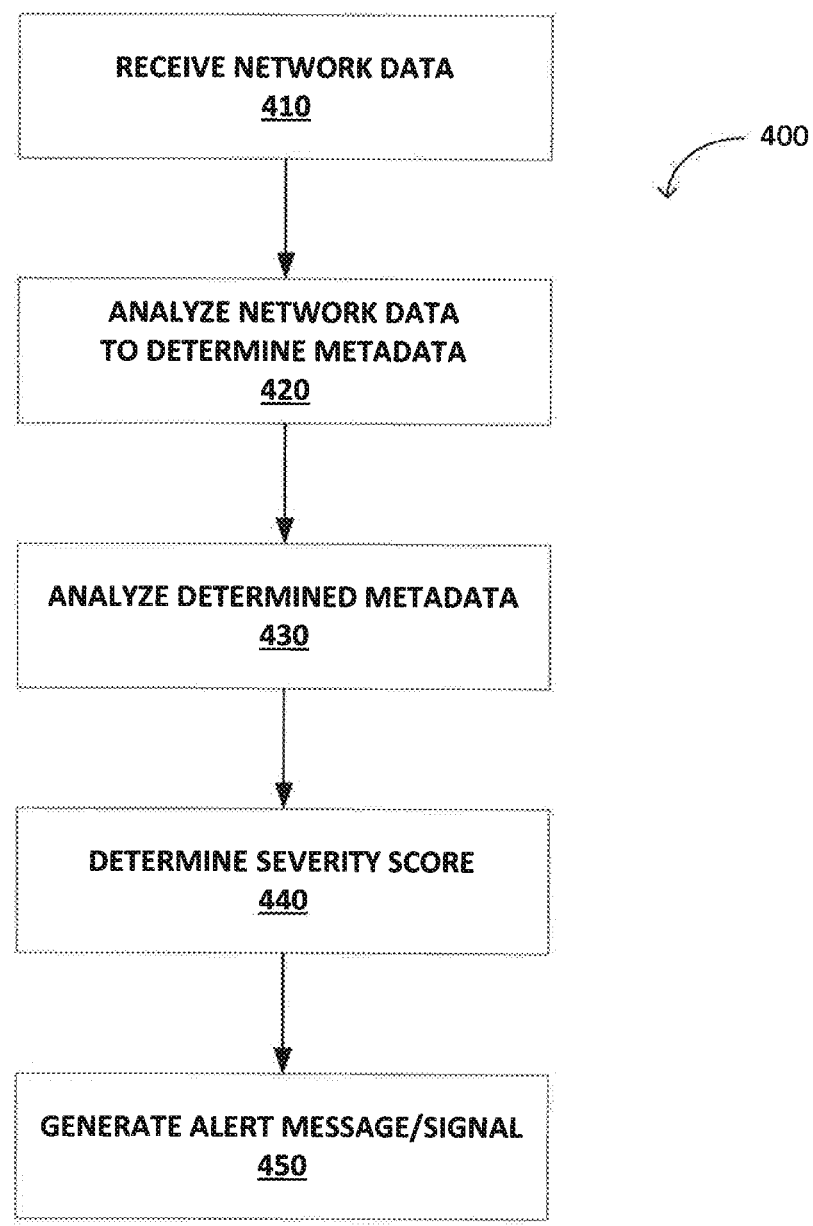
FIG. 4 illustrates a flow chart depicting a process in accordance with the illustrated embodiments for evaluating a threat level presented to a computer network.

With the exemplary computing system environment 300 of FIG. 3 being generally shown and discussed above, with reference now to FIG. 4, shown is a flow chart demonstrating implementation of the various exemplary embodiments in accordance with the above description for determining the score for a threat level associated with a network attack. It is noted that the order of steps of process 400 shown in FIG. 4 may not be required, so in principle, the various steps may be performed out of the illustrated order. Also certain steps may be skipped, different steps may be added or substituted, or selected steps or groups of steps may be performed in a separate application following the embodiments described herein.

Starting at step 400, network data having a detected network attack is received for analysis. The received network data is preferably received from a data store component (310) and preferably includes a plurality of data logs each containing a detected network attack, as described above. The data logs may include (and are not to be understood to be limited to): network logs; endpoint logs; e-mail server logs; DNS server logs, and other or any other logs that enable threat detection.

Next, at step 420, the received network data is analyzed to determine patterns in the metadata indicative of known network attacks. As described above, this preferably includes receiving rules definitions (r) for facilitating the determining of patterns in the metadata indicative of known network attacks, preferably via a detection engine component 330. It is to be appreciated the rule definitions are preferably retrieved from the rules definition component 320 preferably via searching patterns defined within the data store component 310. It is to be further appreciated that the received rules definitions preferably include one or more of packet level signatures, system operations signatures and behavioral signatures.

Next, at step 430 the received network data is then analyzed, preferably via an execution content analyzer (342) associated with a scoring engine component (340) to determine metadata associated with the network attack, as described above. As also mentioned above, this metadata is then analyzed (e.g., in the detection engine component (340)) to preferably determine: the attack execution component ($C_{er}$), associated with the detected network attack.

Then, at step 440, a severity score value is determined for the known network attack based upon calculating a weighted value for each of the: 1) attack objective component; 2) attack method component; and 3) attack execution component. As mentioned above, and preferably via the scoring engine component (340), the severity score value is calculated based upon the calculation:

$$\text{Severity Score} = C_{or}*W_o + C_{mr}*W_m + C_{er}*W_e,$$

wherein: $C_{or}$ is the attack objective component score coefficient for a rule r; $C_{mr}$ is the attack method component score coefficient for a rule r; $C_{er}$, is the attack execution component score coefficient for a rule r; $W_o$ is the weight for the attack objective component; $W_m$ is the weight for the attack method component; and $W_e$ is the weight for the attack execution component. It is to be further appreciated, and as also mentioned above, the received rules definition (r) preferably contains: the coefficient ($C_{or}$) of the attack objective component; the coefficient ($C_{mr}$) of the attack method component; and the coefficient ($C_{er}$) of the attack execution component. Also mentioned above, it is to be appreciated that the coefficient ($C_{or}$) of the attack objective component and the coefficient ($C_{mr}$) of the attack method component are predefined, the coefficient ($C_{er}$) of the attack execution component is a calculated dynamic value, wherein the value of the coefficient ($C_{er}$) of the attack execution component is preferably calculated based upon utilizing contextual metadata in the received network data relevant for the rules definition used for the determined network attack.

Next at step 450, an alert message/signal is generated for the scored network attack based upon the determined severity score value (step 440). It is to be appreciated, based upon the determined severity level of the score value for the network attack, a network attack mitigation device, such as described in above mentioned U.S. Pat. No. 9,060,020, may then be triggered to initiate one or more mitigation actions commensurate with the determined score value (step 440) of the network attack. Additionally, the alert message may also be sent to a network administrator such that the network administrator may initiate appropriate mitigations actions. It is to be understood and appreciated countermeasures are various defense mechanism's formatted to target and remove egregious attack traffic while permitting a network to continue operating wherein different countermeasures are designed to stop different types of attack traffic. Raw countermeasures may include (but are not limited to): Global and Black/White Listing; Zombie; TCP SYN Authentication; DNS Authentication; TCP Connection Reset; Payload Regex Filtering; Baseline Enforcement; Malformed DNS Filtering wherein any UDP ports 53 packets containing no payload are dropped and decoded DNS packets not formed properly are also dropped); SIP Malformed; and Rate Limiting. With regards to Event Driven countermeasures, they may include (but are not limited to): Malformed DNS Filtering; Malformed HTTP; HTTP Object and Request Rate Limiting; HTTP Regex Filtering; Malformed SIP Filtering; and SIP Rate Limiting.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer method for determining a threat level score for a detected network attack, comprising:
   receiving network data having a detected network attack;
   analyzing the received network data to determine metadata associated with the detected network attack;
   analyzing the determined metadata associated with the detected network attack to determine: 1) an attack objective component indicative of an objective to be achieved after successful execution of the network attack, the attack objective component including a score indicative of a level of harm the attack poses to the network; 2) an attack method component; and 3) an intensity of the detected network attack in an attack execution component, the intensity of the detected network attack determined based on the importance of data subject to the detected network attack, each being associated with the detected network attack;
   determining a severity score value of the detected network attack based upon calculating a weighted value for each of: 1) the score indicative of the level of harm the attack poses to the network; 2) the attack method component; and 3) the intensity of the detected network attack in the attack execution component;
   generating an alert of a network attack based upon the determined severity score value; and
   triggering a network attack mitigation device to initiate one or more mitigation actions commensurate with the determined severity score value to target and remove attack traffic from the detected network attack.

2. The computer method as recited in claim 1, wherein the network data is received from a database having a plurality of data logs each containing a detected network attack.

3. The computer method as recited in claim 2, wherein the data logs consist of one or more of network logs, endpoint logs, e-mail server logs, and DNS server logs.

4. The computer method as recited in claim 1, wherein analyzing the received network data includes determining patterns in the metadata indicative of network attacks.

5. The computer method as recited in claim 4, wherein analyzing the received network data includes receiving rules definitions (r) for facilitating the determining of patterns in the metadata indicative of network attacks.

6. The computer method as recited in claim 5, wherein the received rules definitions include one or more of packet level signatures, system operations signatures and behavioral signatures.

7. The computer method as recited in claim 6, wherein the severity score value is calculated based upon:

$$\text{Severity Score} = C_{or}*W_o + C_{mr}*W_m + C_{er}*W_e,$$

whereby: $C_{or}$ is the attack objective component score coefficient for a rule r; $C_{mr}$ is the attack method component score coefficient for a rule r; $C_{er}$, is the attack execution component score coefficient for a rule r; $W_o$ is the weight for the attack objective component; $W_m$ is the weight for the attack method component; and $W_e$ is the weight for the attack execution component.

8. The computer method as recited in claim 7, wherein a received rules definition contains the: coefficient $C_{or}$ of the attack objective component; coefficient $C_{mr}$, of the attack method component; and the coefficient $C_{er}$ of the attack execution component.

9. The computer method as recited in claim 8, wherein each of the coefficient $C_{or}$ of the attack objective component and the coefficient $C_{mr}$ of the attack method component are predefined, and wherein the coefficient $C_{er}$: of the attack execution component is a calculated dynamic value.

10. The computer method as recited in claim 9, wherein the value of the coefficient $C_{er}$ of the attack execution component is calculated based upon utilizing contextual metadata in the received network data relevant for the rules definition used for the determined network attack.

11. A computer system for determining a threat level score for a detected network attack, comprising:
   a memory;
   a processor disposed in communication with said memory, the memory storing instructions thereon that, when executed by the processor, cause the processor to:
   receive network data having a detected network attack;
   analyze the received network data to determine metadata associated with the detected network attack;
   analyze the determined metadata associated with the detected network attack to determine: 1) an attack objective component indicative of an objective to be achieved after successful execution of the network attack, the attack objective component including a score indicative of a level of harm the attack poses to the network; 2) an attack method component; and 3) an intensity of the detected network attack in an attack execution component, the intensity of the detected network attack determined based on the importance of the data subject to the detected network attack, each being associated with the network attack;
   determine a severity score value of the detected network attack based upon calculating a weighted value for each of: 1) the score indicative of the level of harm the attack poses to the network; 2) the attack method component; and 3) the intensity of the detected network attack in the attack execution component;
   generate an alert of a network attack based upon the determined severity score value; and trigger a network attack mitigation device to initiate one or more mitigation actions commensurate with the determined severity score value to target and remove attack traffic from the detected network attack.

12. The computer system as recited in claim 11, wherein the network data is received from a database having a plurality of data logs each containing a detected network attack.

13. The computer system as recited in claim 12, wherein the data logs consist of one or more of network logs, endpoint logs, e-mail server logs, and DNS server logs.

14. The computer system as recited in claim 11, wherein analyzing the received network data includes determining patterns in the metadata indicative of network attacks.

15. The computer system as recited in claim 14, wherein analyzing the received network data includes receiving rules definitions (r) for facilitating the determining of patterns in the metadata indicative of network attacks.

16. The computer system as recited in claim 15, wherein the received rules definitions include one or more of packet level signatures, system operations signatures and behavioral signatures.

17. The computer system as recited in claim 16, wherein the severity score value is calculated based upon:

$$\text{Severity Score} = C_{or} * W_o + C_{mr} * W_m + C_{er} * W_e,$$

whereby: $C_{or}$ is the attack objective component score coefficient for a rule r; $C_{mr}$ is the attack method component score coefficient for a rule r; $C_{er}$, is the attack execution component score coefficient for a rule r; $W_o$ is the weight for the attack objective component; $W_m$ is the weight for the attack method component; and $W_e$ is the weight for the attack execution component.

18. The computer system as recited in claim 17, wherein a received rules definition contains the: coefficient $C_{or}$ of the attack objective component; coefficient $C_{mr}$, of the attack method component; and the coefficient $C_{er}$ of the attack execution component.

19. The computer system as recited in claim 18, wherein each of the coefficient $C_{or}$ of the attack objective component and the coefficient $C_{mr}$ of the attack method component are predefined, and wherein the coefficient $C_{er}$ of the attack execution component is a calculated dynamic value.

20. The computer system as recited in claim 19, wherein the value of the coefficient $C_{er}$ of the attack execution component is calculated based upon utilizing contextual metadata in the received network data relevant for the rules definition used for the determined network attack.

* * * * *